United States Patent
Mizuno

(10) Patent No.: US 8,472,781 B2
(45) Date of Patent: Jun. 25, 2013

(54) PLAYBACK METHOD, PLAYBACK PROGRAM AND PLAYBACK APPARATUS

(75) Inventor: Masayoshi Mizuno, Tokyo (JP)

(73) Assignee: Sony Corporation, Tokyo (JP)

(*) Notice: Subject to any disclaimer, the term of this patent is extended or adjusted under 35 U.S.C. 154(b) by 1692 days.

(21) Appl. No.: 11/849,697

(22) Filed: Sep. 4, 2007

(65) Prior Publication Data

US 2008/0075417 A1   Mar. 27, 2008

(30) Foreign Application Priority Data

Sep. 21, 2006  (JP) .................................. 2006-256537

(51) Int. Cl.
*H04N 5/932* (2006.01)

(52) U.S. Cl.
USPC .......................................... 386/207; 386/201

(58) Field of Classification Search
None
See application file for complete search history.

(56) References Cited

U.S. PATENT DOCUMENTS

| | | | | |
|---|---|---|---|---|
| 5,241,382 A * | 8/1993 | Paik et al. | ................ | 375/240.25 |
| 5,594,660 A | 1/1997 | Sung et al. | | |
| 5,929,902 A * | 7/1999 | Kwok | .............................. | 348/96 |
| 2004/0234237 A1 | 11/2004 | Hamada et al. | | |
| 2005/0019020 A1 * | 1/2005 | Sato et al. | ....................... | 386/96 |
| 2005/0117056 A1 | 6/2005 | Aprea et al. | | |
| 2005/0196143 A1 | 9/2005 | Kato et al. | | |

FOREIGN PATENT DOCUMENTS

| | | |
|---|---|---|
| EP | 1 689 179 A1 | 8/2006 |
| JP | 2-14682 | 1/1990 |
| JP | 2004-304767 | 10/2004 |
| WO | WO 03/085972 | 10/2003 |
| WO | WO 2005/034092 A2 | 4/2005 |

OTHER PUBLICATIONS

Office Action issued Mar. 8, 2011 in Japan Application No. 2006-256537.

* cited by examiner

*Primary Examiner* — William C Vaughn, Jr.
*Assistant Examiner* — Heather Jones
(74) *Attorney, Agent, or Firm* — Oblon, Spivak, McClelland, Maier & Neustadt, L.L.P.

(57) ABSTRACT

A playback method that plays video data and audio data associated with the video data, includes the steps of: calculating, in the video data, a difference between a playback interval and an interval of the audio data; performing first conversion that converts the length of the playback interval in accordance with the difference; and performing second conversion that alternately outputs each frame repeatedly three times and repeatedly two times on the video data and converts the video data at a first frame frequency to the video data at a second frame frequency in a two-to-five relationship with the first frame frequency, wherein the first conversion is configured such that the frame difference after the conversion can be equal to or lower than one between the frame group based on the frame output repeatedly three times and the frame group based on the frame output repeatedly two times.

10 Claims, 10 Drawing Sheets

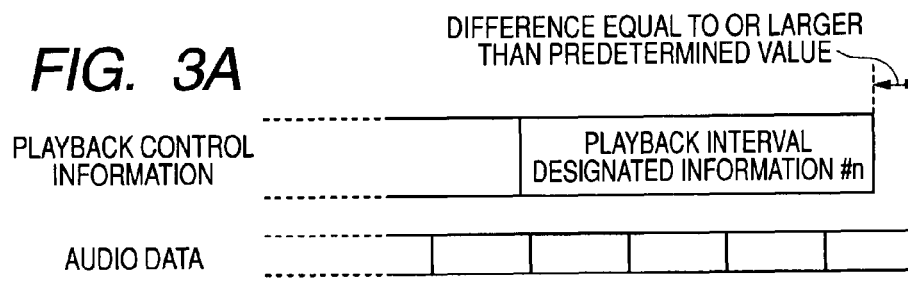
FIG. 3A
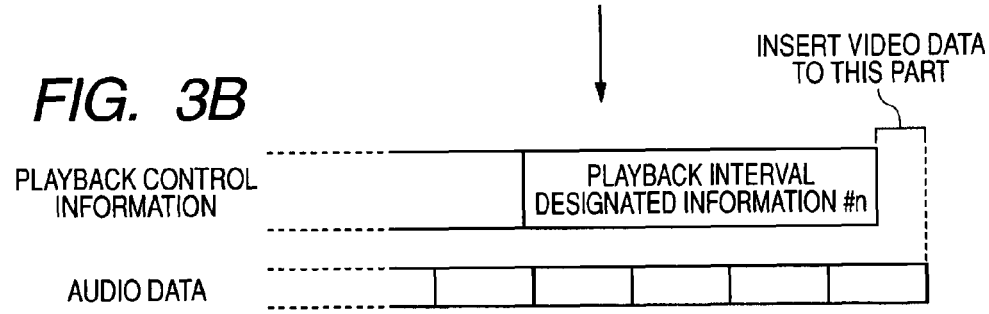
FIG. 3B
FIG. 4A
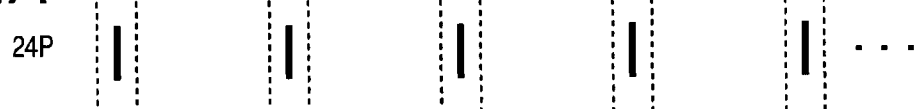
FIG. 4B

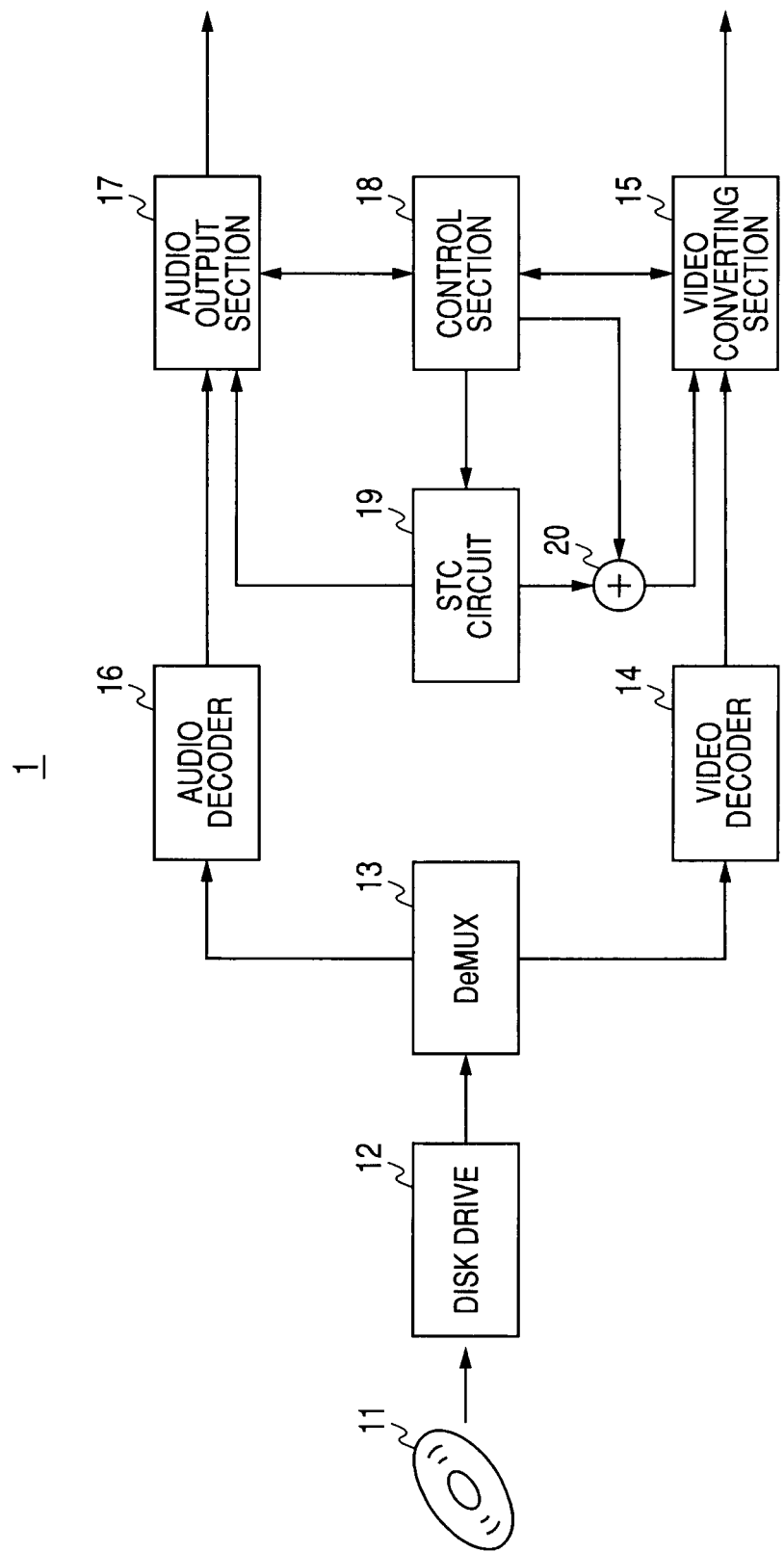

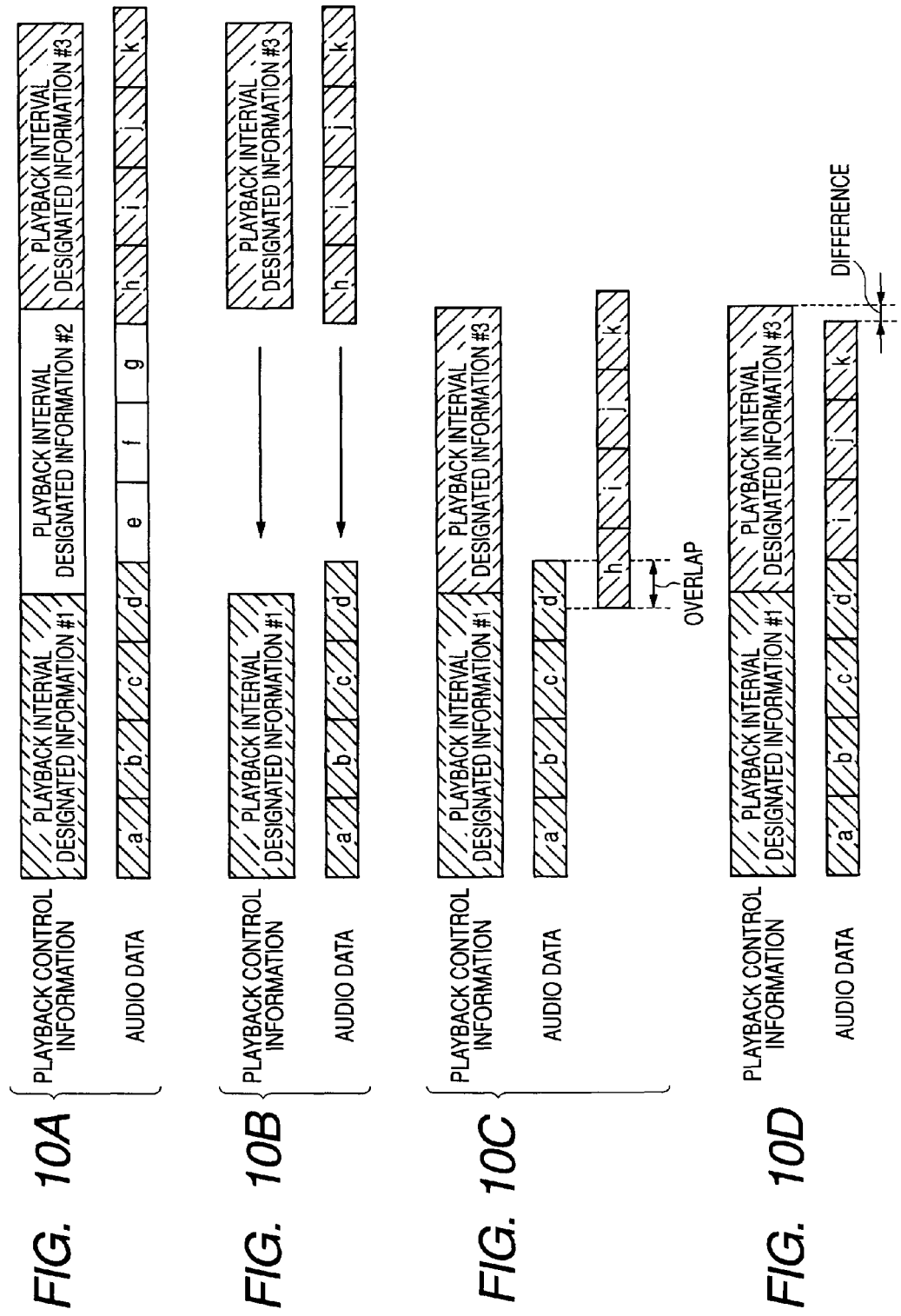

PLAYBACK METHOD, PLAYBACK PROGRAM AND PLAYBACK APPARATUS

CROSS REFERENCES TO RELATED APPLICATIONS

The present invention contains subject matter related to Japanese Patent Applications JP 2006-256537 filed in the Japanese Patent Office on Sep. 21, 2006, the entire contents of which being incorporated herein by reference.

BACKGROUND OF THE INVENTION

1. Field of the Invention

The present invention relates to a playback method, playback program and playback apparatus that play video signals based on playback control information designating the playback interval of video signals.

2. Description of the Related Art

As means for designating a method for playback stream data in which video data and audio data are multiplexed, a method has been known that controls the playback of stream data by using playback interval designated information designating the playback interval or playback order of the stream data and playback control information designating the playback order of the playback interval designated information. In the playback method, the playback interval or playback order can be designated or changed without processing actual stream data, and the stream data can be conveniently easily handled.

The technology relating to the method for playback stream data with reference to the playback interval described in a playback interval designated information within playback control information in this way is disclosed in JP-A-2004-304767.

SUMMARY OF THE INVENTION

Video data in stream data is processed in frames while audio data in stream data is processed in units of processing such as units for compressing and encoding. Since the unit of processing of audio data is determined independently of the unit of processing of video data, the time length of the video data the playback interval of which is designated by a playback interval designated information does not necessarily agree with the time length of the audio data corresponding to the video data.

Now, a case will be considered in which the playback order of multiple serial playback interval designated information #1, #2 and #3 for playback audio data serially is edited to connect the playback interval designated information #1 and #3. In this case, the unit of audio processing including the end of the playback interval designated information #1 is brought into correspondence with the playback interval designated information #1. The unit of audio processing including the beginning of the playback interval designated information #3 is brought into correspondence with the playback interval designated information #3.

When the playback interval designated information #1 and #3 are connected, the unit of audio processing including the end of the playback interval designated information #1 corresponding to the playback interval designated information #1 and the unit of audio processing including the beginning of the playback interval designated information #3 corresponding to the playback interval designated information #3 overlap at the border between the playback interval designated information #1 and #3.

In this case, the overlapping units of audio processing may be played in series in accordance with the playback order of the playback interval designated information, or one unit of audio processing of the overlapping units of audio processing may be deleted to play the audio data directly and continuously.

However, a difference occurs between video images and voice when units of audio processing are played serially or when one of overlapping units of audio processing is deleted to play the other as described above. The differences are accumulated when stream data is repeatedly played based on the playback control information including the playback interval designated information #1 and #3. Therefore, the difference between video images and voice may become significant, which is a problem.

Accordingly, it is desirable to propose a playback method, playback program and playback apparatus that edits pre-edited playback control information to play audio data serially and reduces a difference caused between video images and voice in the playback control information including playback interval designated information having the changed construction so as to prevent unnatural display.

According to an embodiment of the present invention, there is provided a playback method that plays video data and audio data associated with the video data, the method including the steps of calculating, in the video data, a difference between a playback interval designated by the playback interval designated information that designates a playback interval based on a first unit of processing for processing the video data and an interval of the audio data, which is a set of second units of processing in a different length from that of the first unit of processing, corresponding to the playback interval designated information, performing first conversion that converts the length of the playback interval designated by the playback interval designated information in accordance with the difference, and performing second conversion that alternately outputs each frame repeatedly three times and repeatedly two times on the video data and converts the video data at a first frame frequency to the video data at a second frame frequency in a two-to-five relationship with the first frame frequency, wherein the first conversion is configured such that the frame difference after the conversion can be equal to or lower than one between the frame group based on the frame output repeatedly three times and the frame group based on the frame output repeatedly two times, which is subsequent to the frame group based on the frame output repeatedly three times.

According to another embodiment of the invention, there is provided a playback program causing a computer to implement a playback method that plays video data and audio data associated with the video data, the method including the steps of calculating, in the video data, a difference between a playback interval designated by the playback interval designated information that designates a playback interval based on a first unit of processing for processing the video data and an interval of the audio data, which is a set of second units of processing in a different length from that of the first unit of processing, corresponding to the playback interval designated information, performing first conversion that converts the length of the playback interval designated by the playback interval designated information in accordance with the difference, and performing second conversion that alternately outputs each frame repeatedly three times and repeatedly two times on the video data and converts the video data at a first frame frequency to the video data at a second frame frequency in a two-to-five relationship with the first frame frequency, wherein the first conversion is configured such that the frame difference after the conversion can be equal to or lower than one between the frame group based on the frame output repeatedly three times and the frame group based on the frame output repeatedly two times, which is subsequent to the frame group based on the frame output repeatedly three times.

According to another embodiment of the invention, there is provided a playback apparatus that plays video data and audio data associated with the video data, the apparatus including a control section that calculates, in the video data, a difference between a playback interval designated by the playback interval designated information that designates a playback interval based on a first unit of processing for processing the video data and an interval of the audio data, which is a set of second units of processing in a different length from that of the first unit of processing, corresponding to the playback interval designated information, a first converting section that converts the length of the playback interval designated by the playback interval designated information in accordance with the difference, and a second converting section that alternately outputs each frame repeatedly three times and repeatedly two times in the video data and converts the video data at a first frame frequency to the video data at a second frame frequency in a two-to-five relationship with the first frame frequency, wherein the first converting section is configured such that the frame difference after the conversion can be equal to or lower than one between the frame group based on the frame output repeatedly three times and the frame group based on the frame output repeatedly two times, which is subsequent to the frame group based on the frame output repeatedly three times.

According to the embodiments of the invention, video data and audio data have a small difference therebetween since the embodiments calculate, in the video data, a difference between a playback interval designated by the playback interval designated information that designates a playback interval based on a first unit of processing for processing the video data and an interval of the audio data, which is a set of second units of processing in a different length from that of the first unit of processing, corresponding to the playback interval designated information, performs first conversion that converts the length of the playback interval designated by the playback interval designated information in accordance with the difference, and performs second conversion that alternately outputs each frame repeatedly three times and repeatedly two times on the video data and converts the video data at a first frame frequency to the video data at a second frame frequency in a two-to-five relationship with the first frame frequency, wherein the first conversion is configured such that the frame difference after the conversion can be equal to or lower than one between the frame group based on the frame output repeatedly three times and the frame group based on the frame output repeatedly two times.

An embodiment of the invention calculates an amount of overlap between an unit of audio processing including the end of the interval designated by the playback interval designated information being currently played and the unit of audio processing including the beginning of the interval designated by the playback interval designated information expected to process next, determines whether the sum value resulting from the add-up of the calculated amounts of overlap is equal to or larger than one frame and inserts one frame if the sum value is equal to or larger than one frame. Therefore, there is an advantage that the difference between video data and audio data to be played can be reduced.

BRIEF DESCRIPTION OF THE DRAWINGS

FIGS. 3A and 3B are schematic diagrams for describing a method for reducing a difference according to the embodiment of the invention;

FIGS. 4A and 4B are schematic diagram for describing 3-2 pull-down processing;

FIG. 6 is a block diagram showing an example construction of the playback apparatus applicable to the embodiment of the invention;

FIGS. 10A to 10D are schematic diagrams showing example playback processing according to a variation example of the embodiment of the invention;

DESCRIPTION OF THE PREFERRED EMBODIMENTS

With reference to drawings, an embodiment of the present invention will be described below. According to the embodiment of the present invention, the playback of stream data is controlled by using a playback interval designated information that designates the playback interval or playback order of stream data in which video data and audio data are multiplexed and playback control information that designates the playback order of the playback designated information.

Figure 1:
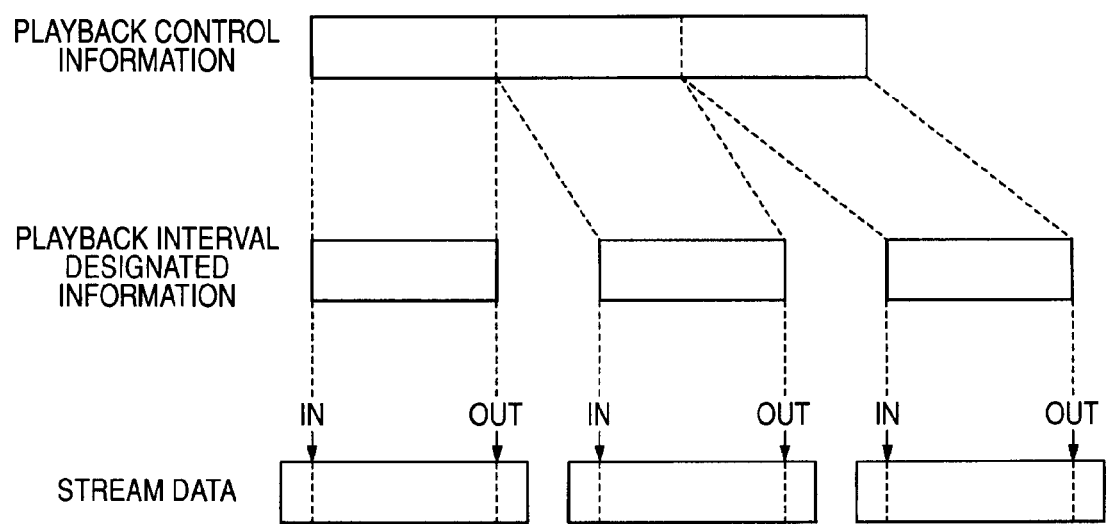
FIG. 1 is a schematic diagram showing a relationship among playback control information, playback interval designated information and stream data.

First of all, with reference to FIG. 1, the relationship among the playback control information, playback interval designated information and stream data will be described. As shown in FIG. 1, a playback interval designated information defines the playback starting point (IN-point) and the playback end point (OUT-point) indicating the playback positions in stream data. The playback interval designated information describes the information on the IN-point and OUT-point as a pair. Playback control information includes a set of multiple playback interval designated information and designates the playback order of the multiple playback interval designated information. In order to play stream data, the corresponding interval in the stream data is played with reference to the information on the IN-point and OUT-point described in the playback interval designated information based on the playback control information.

Figure 2A:
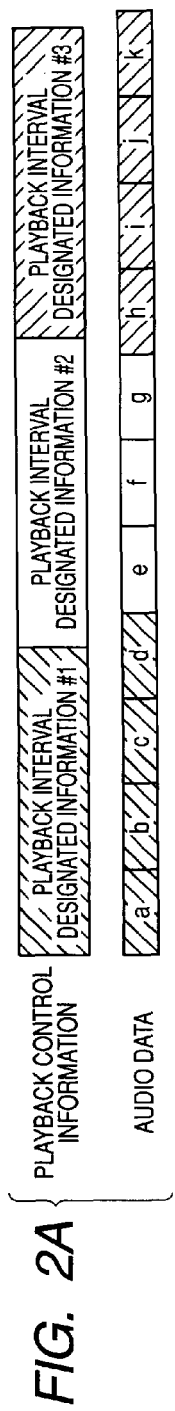
FIGS. 2A to 2D are schematic diagrams showing example playback processing according to an embodiment of the invention.

Next, with reference to FIGS. 2A to 2D, a playback control method according to an embodiment of the invention will be described. For example, as shown in FIG. 2A, units of audio processing a to k have correspondence with playback interval designated information #1 to #3 and are configured to play serially.

Figure 2B:
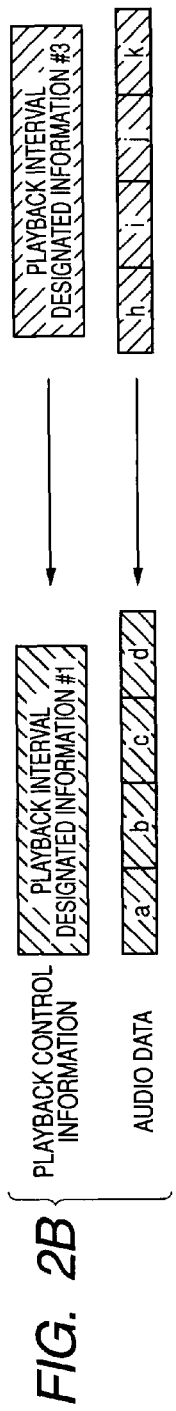

A case will be considered in which, in this way, the playback control information including multiple serial playback interval designated information #1, #2 and #3 for playback audio data serially is edited to connect the playback interval designated information #1 and #3. As shown in FIG. 2B, the playback of the playback interval designated information #1 may require units of audio processing a to d including the beginning and end of the interval designated by the play back interval designated information #1. The playback of the playback interval designated information #3 may require units of audio processing h to k including the beginning and end of the interval designated by the playback interval designated information #3.

Figure 2C:
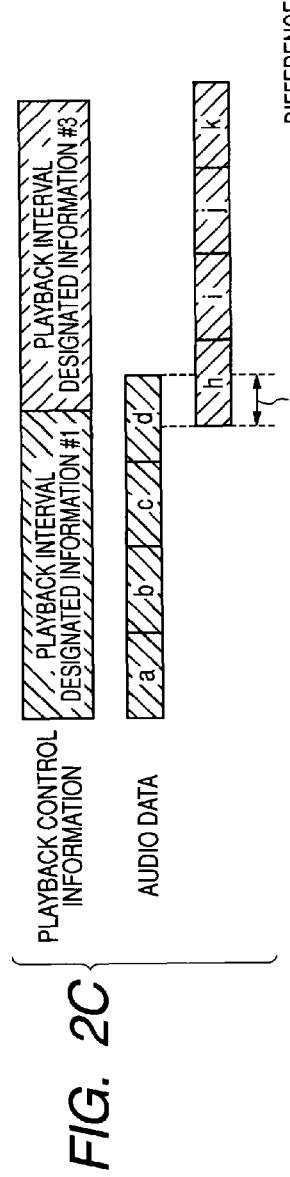

Thus, when the interval designated by the playback interval designated information #1 and the interval designated by the playback interval designated information #3 are connected to play serially, a part of the unit of audio processing d including the end of the interval designated by the playback interval designated information #1 may overlap with a part of the unit of audio processing h including the beginning of the interval designated by the playback interval designated information #3 as shown in FIG. 2C among the units of audio processing h to k corresponding to the playback interval designated information #3.

In this case, as described in the section "SUMMARY OF THE INVENTION", a method that allows the serial playback of audio data may be a first method that plays overlapping units of audio processing serially in accordance with the playback order in the playback interval designated information or a second method that deletes one unit of audio processing of the overlapping units of audio processing. According to the embodiment of the invention, in order to reduce a difference between video data and audio data, the first method is used that serially plays overlapping units of audio processing in accordance with the playback order of the playback interval designated information.

Figure 2D:
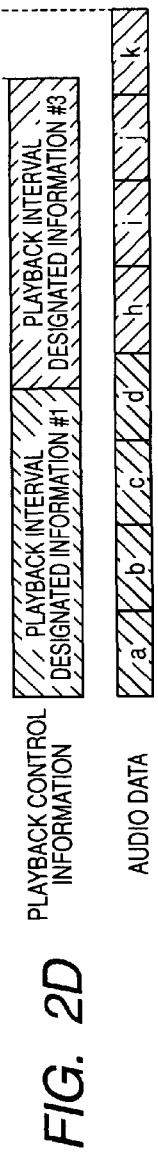

In the first method, as shown in FIG. 2D, the overlapping units of audio processing d and h are positioned in order based on the playback order of the playback interval designated information #1 and #3. By positioning the overlapping units of audio processing in order in this way, a difference occurs between the playback end position of the playback control information and the playback end position of the audio data. The time length of the differences to be accumulated increases when multiple playback interval designated information are connected as the number of connections of the playback interval designated information having correspondence with audio data, which are not continuous at the borders. For example, the differences are accumulated every time the playback control information having this construction is repeated.

Accordingly, as shown in FIG. 3A, if the time length of differences is equal to or longer than a predetermined value, video data for the corresponding predetermined period of time is inserted. By doing this, the difference between the playback control information and the audio data can be reduced. More specifically, if the time length of differences is equal to or longer than the time length for one video frame, for example, one video frame is inserted as shown in FIG. 3B.

By the way, movie images, for example, may have been produced by using an optical film from the past and are video signals of 24 frames per second. This means that the video signals are progressive-scan video signals at a frame frequency of 24 Hz. Currently, a method has been developed that records video signals of movie images, for example, at a frame frequency of 24 Hz to a recording medium without conversion of the frame frequency. The playback interval designated information in this case are described based on time information of signals at a frame frequency of 24 Hz. Therefore, in order to play movie images, the video signals at a frame frequency of 24 Hz may be necessary to convert to video signals at a frame frequency suitable for monitor display.

On the other hand, in NTSC (National Television System Committee), which is used for television broadcasting in Japan, for example, the frame frequency of video signals is 59.94 Hz, and the frame frequency of a monitor apparatus that displays video images is also 59.94 Hz. Therefore, if the frame frequency of video signals is not 59.94 Hz, like the case of movie images at a frame frequency of 24 Hz, the frame frequency may be required to convert to 59.94 Hz.

In order to convert progressive scan video signals at a frame frequency of 24 Hz (which may be called 24 p video signals, hereinafter) to progressive scan video signals at a frame frequency of 59.94 Hz (which may be called 59.94 p video signals), processing is performed of converting frames of original video signals at a frame frequency of 24 Hz alternately to three frames and two frames of progressive scan video signals at a frame frequency of 60 Hz (which may be called 60 p video signals, hereinafter) once, that is, so-called 3-2 pull-down (or 2-3 pull down) processing is performed. Then, predetermined conversion processing is performed on the 60 p video signals to 59.94 p video signals.

The 24 p video signals and 60 p video signals have a 2-to-5 relationship in frame frequency. Accordingly, as shown in FIG. 4A, for example, 3-2 pull-down is performed on the frames of 24 p video signals to alternately output three times repeatedly and output two times repeatedly for output at a frame frequency of 60 Hz as shown in FIG. 4B. Thus, 24 p video signals can be converted to 60 p video signals.

A set of adjacent frames in which 24 p frames are repeated n types by 3-2 pull-down processing is called group, hereinafter. A group including adjacent three frames resulting from the repetition of a 24 p frame three times is called three-frame group, and a group including adjacent two frames resulting from the repetition of a 24 p frame two times is called two-frame group, hereinafter.

According to this embodiment of the invention, in order to reduce a difference between video data and audio data, the processing of inserting one video frame is performed on the two-frame group during the 3-2 pull-down (or 2-3 pull-down).

In other words, inserting one frame group to a three-frame group results in a group including four same frames which are three-frame group and one same frame subsequently to a two-frame group. In this case, the four same frames are played immediately after the playback of the two-frame group, and a two-frame group is next played. Therefore, the difference in number of frames between the group with the frame insertion and the groups without the frame insertion before and after the group is equal to or higher than 2, which results in unnatural display.

Figure 5A:
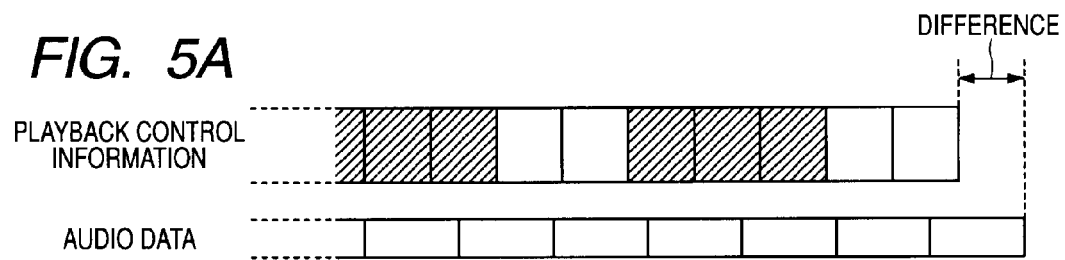
FIGS. 5A and 5B are schematic diagrams for describing a method for reducing a difference between video data and audio data, which applies the 3-2 pull-down processing.
Figure 5B:
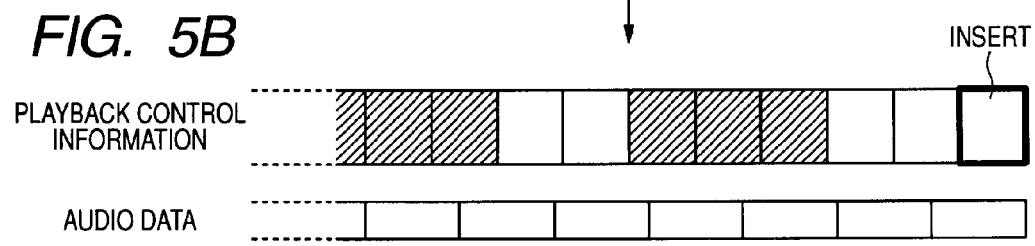

Accordingly, as shown in FIG. 5A, in video signals having undergone 3-2 pull-down processing, one frame is inserted to a two-frame group. Thus, as shown in FIG. 5B, the difference in number of frames between the group with the insertion of one frame and the groups without the frame insertion before and after the group is not equal to or higher than two frames, which can prevent unnatural display.

FIG. 6 shows an example construction of a playback apparatus 1 to which this embodiment of the invention is applicable. A case in which, for example, the change of the frame frequency of video data is necessary, like the case in which video data at a frame frequency of 24 Hz is necessary to convert to video data at a frame frequency of 59.94 Hz will be described below. The playback apparatus 1 includes a disk drive 12, a demultiplexer (DeMUX) 13, a video decoder 14, a video converting section 15, an audio decoder 16, an audio output section 17, a control section 18 and an STC (System Time Clock) circuit 19.

Stream data is recorded in a removable recording medium 11 for supply. The recording medium 11 may be a read-only or writable disk-shaped recording medium, a semiconductor memory such as a flash memory or a removable hard disk drive, for example. The disk-shaped recording medium may be a "BLU-RAY DISC (Registered Trademark)" or a BD-ROM (Blu-ray Disc-Read Only Memory), which is within read-only specifications based on the "BLUE-RAY DISC", or a DVD (Digital Versatile Disc) or a CD (Compact Disc), for example.

Stream data may be supplied from a communication network such as the Internet or digital television broadcasting, for example, instead of the disk-shaped recording medium. Stream data to be described below is supplied from the removable recording medium 11, for example, such as a disk-shaped recording medium.

The disk drive 12 reads stream data recorded in the recording medium 11 installed therein. The recording medium 11 may record stream data in which video data and audio data are multiplexed in a transport stream (TS) or program stream (PS) format defined by MPEG2 (Moving Picture Experts Group 2) systems, for example. The transport stream or program stream read from the recording medium 11 is supplied to the demultiplexer 13.

The demultiplexer 13 demultiplexes the video stream and audio stream from the supplied stream data. When stream data is supplied as a transport stream from the disk drive 11, the demultiplexer 13 analyzes a PID (Packet IDentification) of each transport packet and collects packets storing video data. The demultiplexer 13 reconstructs a PES (Packetized Elementary Stream) packet from the data stored in the payloads of the collected packets. Then, based on the information stored in the header of the PES packet, for example, the elementary stream of the video data is extracted from each PES packet, and video stream is reproduced. Like the reproduction of a video stream, the demultiplexer 13 collects packets storing audio data based on the PID of each transport packet and reproduces the audio stream.

When stream data is supplied as a program stream from the disk driver 12, the demultiplexer 13 demultiplexes a PES packet based on the header information such as a pack header, extracts the elementary stream of video data of each PES packet based on the information stored in the header of the PES packet and reproduces the video stream. Like the reproduction of a video stream, the demultiplexer 13 demultiplexes a PES packet based on the header information such as a pack header and reproduces the audio stream.

The video stream demultiplexed by the demultiplexer 13 is supplied to the video decoder 14 while the audio stream is supplied to the audio decoder 16. The video decoder 14 decodes the supplied video stream and outputs the result as baseband video data.

Here, the encoding format on video stream transmitted by the MPEG2 systems, for example, is not limited to MPEG2. For example, video stream encoded by an encoding format defined by ITU-T (International Telecommunication Union-Telecommunication Standardization Section) recommendation H.264 or ISO (International Organization for Standardization)/IEC (International Electrotechnical Commission) International Standards 14496-10 (MPEG-4 Part 10) Advanced Video Coding (which will be abbreviated to H.264|AVC, hereinafter) or VC1 (Video Codec 1) format may be transmitted by the MPEG2 systems.

The video decoder 14 can decode a video stream in accordance with multiple encoding formats. In this case, the video decoder 14 identifies the encoding format based on the header information of a video stream or the attribute information added to a video stream in a predetermined manner and decodes the video stream by the corresponding decoding format. An encoding format can also be defined under the external control based on a user operation, for example.

Apparently, the video decoder 14 may be configured to support a single encoding format only. In this case, when a video stream in an encoding format not supported by the video decoder 14 is supplied, error processing may be performed, for example.

The video decoder 14 further obtains the frame rate or frame frequency of the supplied video stream. For example, the information on the frame rate is stored in the header part of a stream in MPEG2, H.264|AVC or VC1 format. The video decoder 14 extracts the information on the frame rate from the header part, for example, of the supplied video stream and obtains the frame rate of the video stream.

More specifically, in MPEG2 format, the frame rate "frame_rate_value" is described under a data item, "frame_rate_code" within a Sequence Header. In H.264|AVC format, a frame rate "Frame_rate_value" is obtained by calculating (time_scale/num_units_in_tick)/2 by using a parameter "num_units_in_tick" and a parameter "time_scale" within a sequence parameter "vui_parameters ( )" and a parameter "time_scale" in a Sequence Parameter Set. In VC1 format, a frame rate "frame_rate_value" is obtained by calculating (value of Frame Rate Numerator)/(value of Frame Rate Denominator) by using the value "value of Frame Rate Numerator" and the value "value of Frame Rate Denominator" under the items "FRAMERATENR" and "FRAMERATEDR" in a sequence layer "SEQUENCE LAYER ( )".

The video decoder 14 supplies the video data with a decoded video stream and the frame rate information obtained in a predetermined manner from the video stream to the video converting section 15. The video data is supplied to the video converting section 15 based on the frame rate of the video data.

The audio decoder 16 decodes the supplied audio stream based on a predetermined unit of processing and outputs the result in units of audio processing to the audio output section 17. The audio stream includes the alignment of units of audio processing, each of which is called decodable AU (Access Unit).

The codec processing to be performed on an audio stream can use various formats and may be MP3 (MPEG audio layer 3), AC3 (Audio Code number 3) or AAC (Advanced Audio Coding). The playback interval of the decoded unit of audio processing depends on the applicable codec processing. For example, the playback interval of an unit of audio processing when MP3 is used as codec processing is 1152 [sample]/48 [kHz]=24 [msec] where the sampling frequency is 48 [kHz]. For example, the playback interval of the unit of audio processing is 1536 [sample]/48 [kHz]=32 [msec] when AC3 is used as codec processing where the sampling frequency is 48 [kHz]. For example, the playback interval of the unit of audio processing is 1024 [sample]/48 [kHz]=21.33 [msec] when AAC is used as codec processing where the sampling frequency is 48 [kHz].

The audio decoder 16 can decode an audio stream in accordance with the multiple encoding formats like the video decoder 14. In this case for example, the audio decoder 16 identifies the encoding format and/or sampling frequency based on the header information of a given audio stream or the attribute information added to a given audio stream in a predetermined manner and decodes the audio stream in the corresponding decoding format.

The control section 18 includes a CPU (Central Processing Unit), a ROM (Read Only Memory) and a RAM (Random Access Memory). The ROM prestores a program to be operated on the CPU and data necessary for an operation. The RAM is used as a work memory for the CPU. The CPU loads a program or data stored in the ROM as required and controls the components of the playback apparatus 1 by using the RAM as a work memory. The ROM may be updated by rewriting a program or data stored therein.

The STC circuit 19 generates an STC, which is a synchronization reference signal for synchronizing video data and audio data. The generated STC is supplied to the video converting section 15 and audio output section 17.

Figure 7:
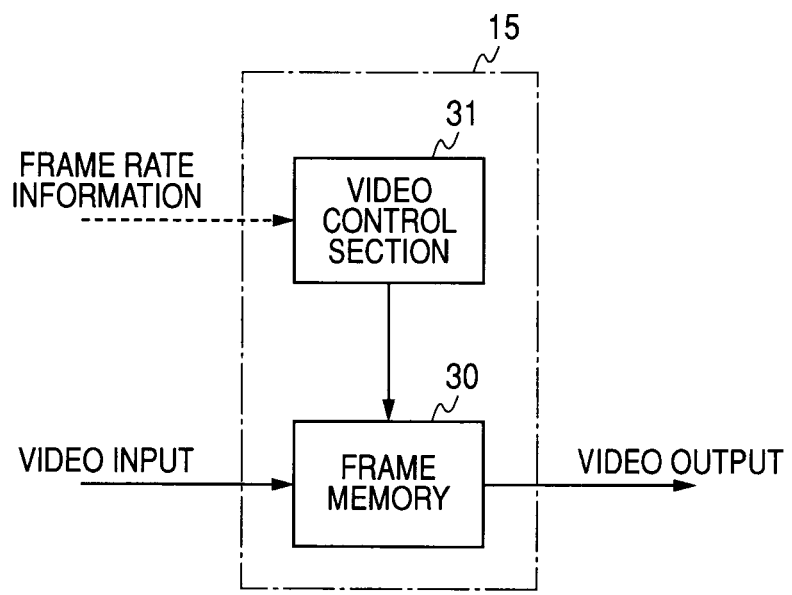
FIG. 7 is a block diagram showing an example construction of a video converting section.

The video converting section 15 converts the frame frequency of the video data based on the frame rate information supplied from the video decoder 14. For example, as illustrated in FIG. 7, the video converting section 15 includes a frame memory 30 and a video control section 31. The video control section 31 controls the loading of video data from the frame memory 30 under the control of the control section 18 to perform the 3-2 pull-down processing.

For example, the 3-2 pull-down processing that converts 24 p video data to 60 p video data stores the 24 p video data, that is, the video data supplied at a frame frequency of 24 Hz to the frame memory 30 in frames. The video control section 31 controls to load one same frame from the frame memory 30 three or two times repetitively.

The video converting section 15 further corrects a difference between video data and audio data under the control of the control section 18. For example, the video converting section 15 may insert a picture at a predetermined time based on the clock supplied from the STC circuit 19 through an adder 20.

The video converting section 15 further converts 60 p video data to 59.94 p video data by performing processing of thinning out a predetermined one frame of every 1001 frames on the video data processed as described above.

The converted video data is output based on the STC value, which is a synchronization reference signal supplied from the STC circuit 19, if the STC value agrees with the time defined by the PTS of the video data.

The audio output section 17 may have a buffer, not shown, for example, and store a decoded unit of audio processing in the buffer. Then, based on the STC value supplied from the STC circuit 19, the audio output section 17 serially outputs units of audio processing if the STC value agrees with the time defined by the PTS of the audio data. The audio output section 17 further supplies information for calculating an amount of overlap of units of audio processing to the control section 18.

The control section 18 calculates an amount of overlap of units of audio processing based on the information supplied from the audio output section 17 and adds up amounts of overlap. Then, if the sum value of the amounts of overlap is equal to or longer than a predetermined value such as one frame, the control section 18 controls the video converting section 15 to insert a picture at a predetermined time. The control section 18 further controls to delay the STC value supplied from the STC circuit 19 to the video converting section 15 by an amount equivalent to a predetermined value such as one frame through the adder 20.

Having described that the components of the playback apparatus 1 shown in FIG. 6 are provided by hardware, the invention is not limited to the example. In other words, all or a part of the demultiplexer 13, video decoder 14, video converting section 15, audio decoder 16, audio output section 17, control section 18 and STC circuit 19 of the playback apparatus 1 may be constructed by executing a predetermined program on the CPU. The program may be prestored in a ROM, not shown, that the playback apparatus 1 has or may be recorded in a recording medium such as a DVD-ROM and a CD-ROM to supply. The program can be provided over a communication network such as the Internet. The supplied program may be stored in a hard disk drive or a non-volatile memory, not shown, that the playback apparatus 1 has, and may be loaded to and executed by the CPU.

Figure 8:
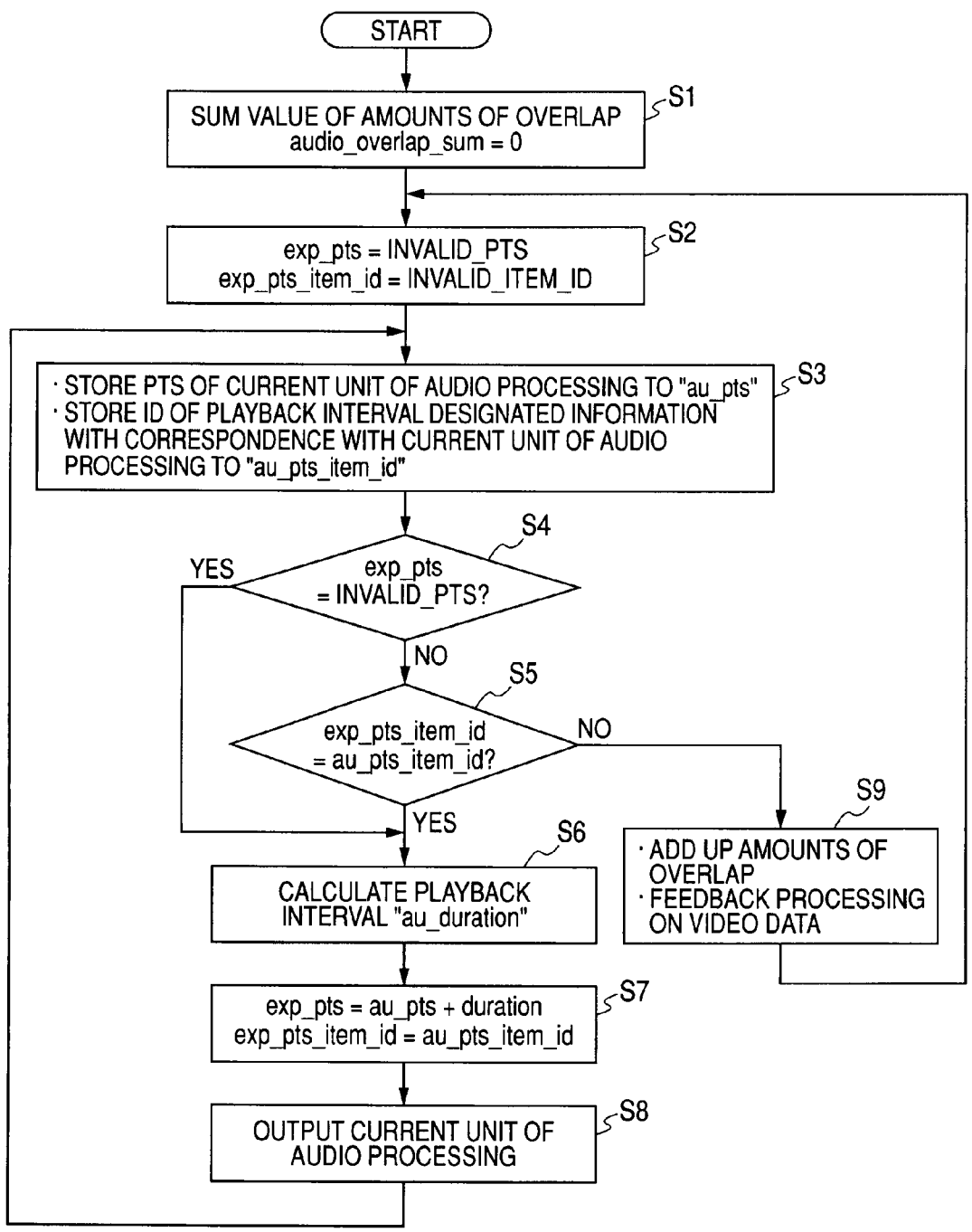
FIG. 8 is a flowchart showing example playback processing according to the embodiment of the invention.

FIG. 8 is a flowchart showing example playback processing according to the embodiment of the invention. The playback processing illustrated in FIG. 8 is mainly performed by the control section 18 of the playback apparatus 1. When the recording medium 11 is installed in the disk drive 12, and the recording medium 11 is read by the disk drive 12, the information for displaying a menu from the recording medium 11 and the playback control information and playback interval designated information to be played under the title designated through a menu are loaded to a memory, not shown. The control section 18 controls the playback of stream data recorded in the recording medium 11 by using the read information. In this example, when the frame frequency of the video data to be played is 24 Hz, the conversion processing such as the 3-2 pull-down processing is performed on the video data in the video converting section 15 in parallel with the playback processing.

In step S1, when multiple playback interval designated information are aligned to play serially, the amount-of-overlaps sum value "audio_overlap_sum" indicating the sum of the amounts of overlap of units of audio processing corresponding to the playback interval designated information is "0".

In the next step S2, the PTS value "exp_pts" of the unit of audio processing expected to process subsequently to the current unit of audio processing is defined as the value "INVALID_PTS" that indicates that the value "exp_pts" is invalid. Furthermore, the value "exp_pts_item_id" indicating the ID, which is identification information for identifying the playback interval designated information expected to process subsequently to the playback interval designated information currently being played, is defined as the value "INVALID_ITEM_ID" indicating that the value "exp_pts_item_id" is invalid.

In step S3, the PTS value of the current unit of audio processing is stored in the value "au_pts". The value indicating the ID, which is identification information for identifying the playback interval designated information currently being played, is stored in the value "au_pts_item_id".

In step S4, whether the PTS value "exp_pts" of the unit of audio processing expected to process next is the value "INVALID_PTS" or not is determined. If the PTS value "exp_pts" of the unit of audio processing expected to process next is determined as the value excluding the value "INVALID_PTS", the processing moves to step S5. If it is determined that the value "exp_pts" is the value "INVALID_PTS", the processing moves to step S6.

In step S5, whether the value "exp_pts_item_id" and the value "au_pts_item_id" are equal or not is determined. If it is determined that the value "exp_pts_item_id" and the value "au_pts_item_id" are equal, the processing moves to step S6.

In step S6, the playback interval "audio_interval" of the current unit of audio processing is calculated based on the codec processing on the current unit of audio processing and the sampling frequency. In step S7, the playback interval "audio_interval" of the unit of audio processing is added to the PTS value "au_pts" of the current unit of audio processing based on:

$$exp\_pts=au\_pts+audio\_interval \qquad [EQ1]$$

Then, the result is stored in the PTS value "exp_pts" of the unit of audio processing expected to process next. Furthermore, based on:

$$exp\_pts\_item\_id=au\_pts\_item\_id \qquad [EQ2]$$

the ID value "au_pts_item_id" of the current playback interval designated information is stored in the ID value "exp_pts_item_id" of the playback interval designated information expected to process next. Then, in step S8, the current unit of audio processing is output, and the next unit of audio processing is defined as the current unit of audio processing. Then, the processing returns to step S3.

On the other hand, if it is determined in step S5 that the ID value "exp_pts_item_id" of the playback interval designated information having correspondence with the expected unit of audio processing is different from the ID value "au_pts_item_id" of the playback interval designated information having correspondence with the current unit of audio processing, the processing moves to step S9.

In step S9, the amount of overlap between the unit of audio processing including the end of the playback interval designated information being currently played and the unit of audio processing including the beginning of the playback interval designated information expected to process next is calculated, and the calculated amounts of overlap are added up. Then, if the added amount of overlap is equal to or higher than a predetermined value, feedback processing of inserting a video frame is performed hereon. Then, the processing returns to step S2. The details of the processing in step S9 will be described later.

Figure 9:
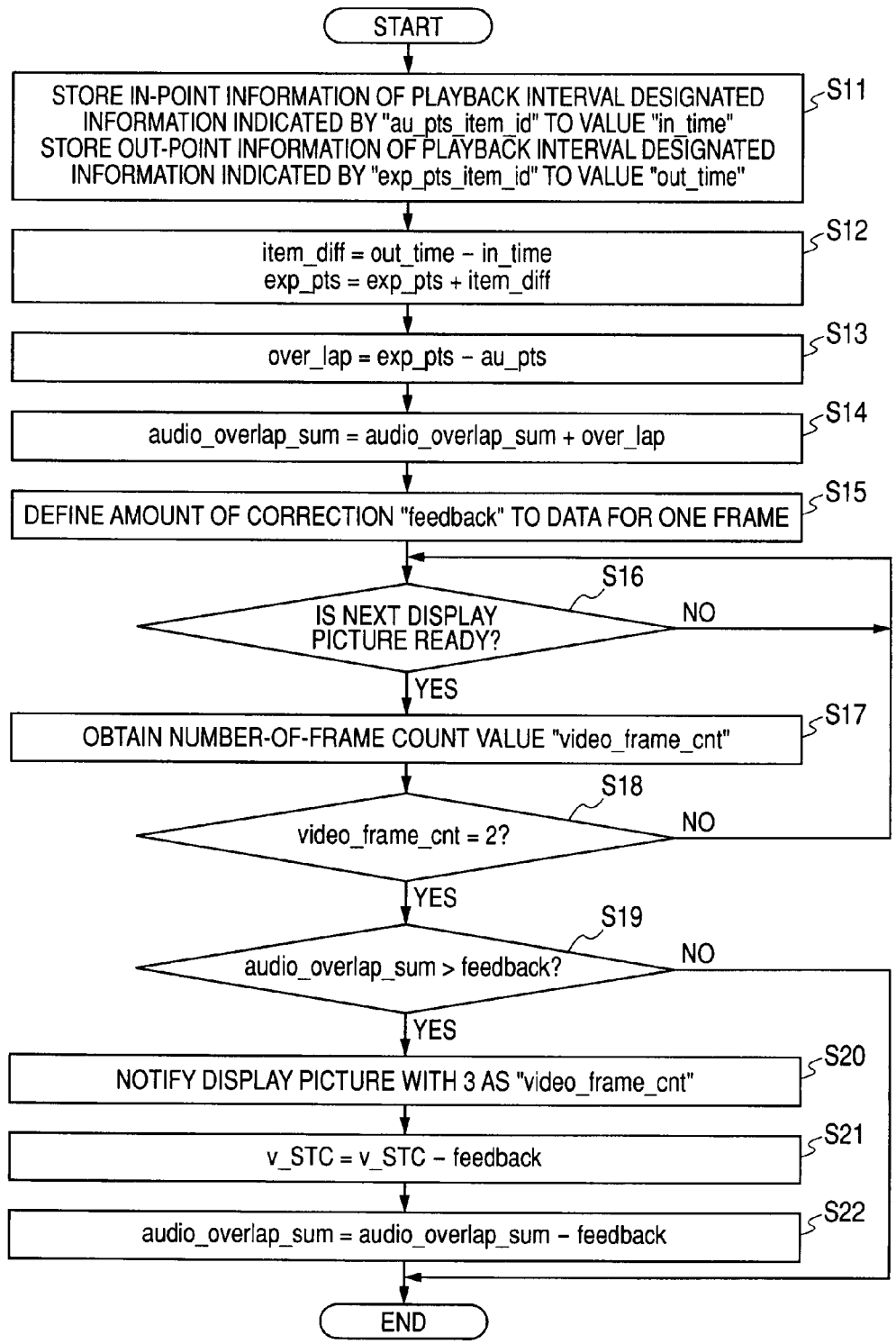
FIG. 9 is a flowchart showing processing of adding up amounts of overlap of units of audio processing and feedback processing.

Next, the addition of amounts of overlap of units of audio processing and feedback processing in step S9 will be described with reference to FIG. 9. In step S11, the information indicating the IN-point in the playback interval designated information indicated by the value "au_pts_item_id" is stored in the value "in_time". The information indicating the OUT-point in the playback interval designated information indicated by the value "ex_pts_item_id" is stored in the value "out_time".

In step S12, the PTS value of an expected unit of audio processing is converted to the time of the PTS of the current unit of audio processing based on:

$$item\_diff=out\_time-in\_time \qquad [EQ3]; and$$

$$exp=pts=exp\_pts+item\_diff \qquad [EQ4]$$

In step S13, the amount of overlap "over_lap" of overlapping units of audio processing is calculated based on:

$$over\_lap=exp\_pts-au\_pts \qquad [EQ5]$$

In step S14, the amount-of-overlap sum value "audio_overlap_sum", which is a sum value of the amounts of overlap "over_lap", is calculated based on:

$$audio\_overlap\_sum=audio\_overlap\_sum+over\_lap \qquad [EQ6]$$

Then, in step S15, the amount of correction "feedback" correcting the amount-of-overlap sum value "audio_overlap_sum" resulting from the addition is defined to the time for one frame.

In step S16, whether the next display picture is ready or not is determined. If it is determined that the next display picture is ready, the processing moves to step S17. On the other hand, if it is determined that the next display picture is not ready, the processing returns to step S16. The processing in step S16 is repeated until the next display picture is ready.

In step S17, the number-of-frames count value "video_frame_cnt" within a frame group in the 3-2 pull-down processing performed in the video converting section 15 is obtained from the video converting section 15. In step S18, whether the value of the number-of-frames count value "video_frame_cnt" is "2" or not is determined. If it is determined that the number-of-frames count value "video_frame_cnt" is "2", the processing moves to step S19. On the other hand, if it is determined that the number-of-frames count value "video_frame_cnt" is not "2", the processing returns to step S16.

In step S19, whether the amount-of-overlap sum value "audio_overlap_sum" resulting from the addition is higher than the value of the amount of correction "feedback" or not is determined. If it is determined that the amount-of-overlap sum value "audio_overlap_sum" is higher than the value of the amount of correction "feedback", the processing moves to step S20. On the other hand, if it is determined the amount-of-overlap sum value "audio_overlap_sum" is equal to or lower than the value of the amount of correction "feedback", the processing including a series of the steps ends and returns to step S2 in FIG. 8.

In step S20, the number-of-frame count value "video_frame_cnt" as "3" is notified to the video converting section 15. In other words, in the 3-2 pull-down processing in the video converting section 15, the part resulting from reading one picture repetitively two times is read repetitively three times. Thus, a picture for one frame is inserted to a two-frame group. Therefore, the playback timing of video data is delayed by one frame, and the difference between video data and audio data can be reduced.

In step S21, the amount of correction "feedback" is subtracted through adder 20 from the value "v_STC of the synchronization reference time STC supplied from the STC circuit 19 to the video converting section 15 based on:

$$v\_STC=v\_STC-feedback \qquad [EQ7]$$

In step S22, the amount of correction "feedback" is subtracted from the amount-of-overlap sum value "audio_overlap_sum based on:

$$audio\_overlap\_sum=audio\_overlap\_sum-feedback \qquad [EQ8]$$

Thus, the amount-of-overlap sum value "audio_overlap_sum" is corrected.

This processing calculates the amount of overlap "over_lap" between the unit of audio processing including the end of the interval designated by the playback interval designated information currently being played and the unit of audio processing including the beginning of the interval designated by the playback interval designated information expected to process next and determines whether the sum value "audio_overlap_sum" resulting from the addition of calculated amounts of overlap is equal to or longer than one frame or not. If the sum value "audio_overlap_sum" is equal to or longer than one frame, one frame is inserted. Thus, the difference between video data and audio data to be played can be reduced. Furthermore, unnatural display can be prevented since one frame is inserted to a two-frame group in the 3-2 pull-down processing in the video converting section 15.

Next, a variation example of the embodiment of the invention will be described. In the variation example of the embodiment of the invention, in order to reduce a difference between video data and audio data, the second method is used whereby audio data is serially played by deleting one unit of audio processing between the unit of audio processing including the end of the interval designated by the proceeding playback interval designated information and the unit of audio processing including the beginning of the interval designated by the next playback interval designated information.

FIGS. 10A to 10D show an example of the specific playback control method for stream data in a case when playback control information is edited to create different playback control information. For example, as shown in FIG. 10A, correspondence is established between units of audio processing a to k and playback interval designated information #1 to #3 to play them serially.

A case will be described in which the playback control information including multiple serial playback interval designated information #1, #2 and #3 for playback audio data serially is edited to connect the playback interval designated information #1 and #3. As shown in FIG. 10B, in order to play the playback interval designated information #1, the units of audio processing a to d including the beginning and end of the interval designated by the playback interval designated information #1 may be required. In order to play the playback interval designated information #3, the units of audio processing h to k including the beginning and end of the interval designated by the playback interval designated information #3 may be required.

Thus, when the playback interval designated information #1 and the playback interval designated information #3 are connected to play serially, a part of the unit of audio processing d including the end of the interval designated by the playback intervals designated information #1 overlaps with a part of the unit of audio processing h including the beginning of the interval designated by the playback interval designated information #3, as shown in FIG. 10C.

In this case in the variation example of the embodiment of the invention, one unit of audio processing of the overlapping units of audio processing d and h is deleted, as shown in FIG. 10D. Thus, a difference occurs between the playback end position of the playback control information and the playback end position of the audio data by deleting one unit of audio processing of the overlapping two units of audio processing. Notably, having described the example in which the unit of audio processing h of the overlapping units of audio processing d and h is deleted, the invention is not limited thereto. The unit of audio processing d of the overlapping units of audio processing d and h may be deleted.

Figure 11A:
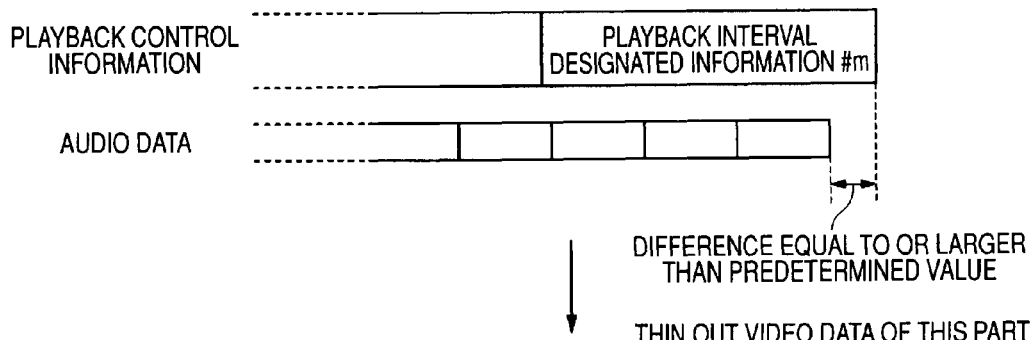
FIGS. 11A and 11B are schematic diagrams for describing a method for reducing a difference according to the variation example of the embodiment of the invention.
Figure 11B:
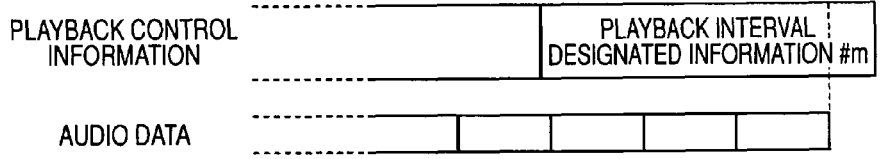

In this variation example of the embodiment of the invention, video data for a predetermined period of time is thinned out as shown in FIG. 11A if the time length of the difference is equal to or longer than a predetermined value. Thus, the difference between the playback control information and audio data can be reduced. More specifically, if the time length of the difference is equal to or longer than the time length for one video frame, one video frame is thinned out as shown in FIG. 11B.

The 3-2 pull-down (or 2-3 pull-down) processing described with reference to the embodiment above is performed on video signals excluding 59.94 p video signals, such as 24 p video signals. Thus, 24 p video signals may be converted to 60 p video signals.

In the variation example of the embodiment of the invention, in order to reduce a difference between video data and audio data, the processing of thinning out one video frame is performed on a three-frame group in the 3-2 pull-down (or 2-3 pull-down) processing.

In other words, when one frame is thinned out from a two-frame group, the three-frame group is followed by one frame resulting from thinning out one frame from a two-frame group and is then followed by a three-frame group. In this case, immediately after the playback of the three-frame group, one frame resulting from thinning out one frame from a two-frame group is played, and a three-frame group is then played. Thus, the difference in number of frames is equal to or higher than 2 between the group subject to frame thinning out and the groups without thinning out before and after the group, resulting in unnatural display.

Figure 12A:
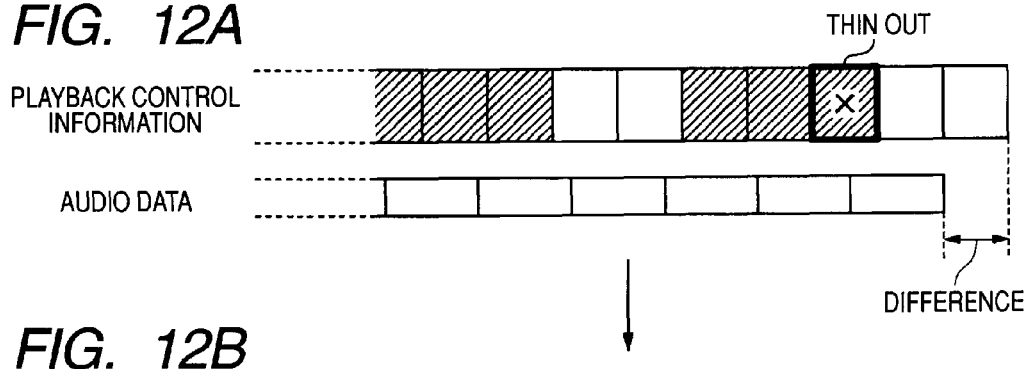
FIGS. 12A and 12B are schematic diagrams for describing a method for reducing a difference between video data and audio data, which applies 3-2 pull-down processing according to the variation example of the embodiment of the invention.
Figure 12B:
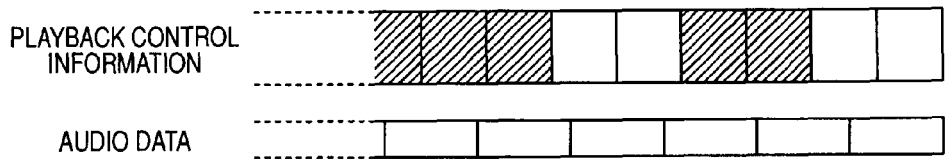

Accordingly, in order to perform frame thinning out on video signals subject to the 3-2 pull-down processing, one frame is thinned out from a three-frame group, as shown in FIG. 12A. Thus, as shown in FIG. 12B, the difference in number of frame between the group subject to one-frame thinning out and the groups without frame thinning out before and after the group is equal to or higher than two frames, which can prevent unnatural display.

In this way, in the embodiment of the invention and the variation example of the embodiment of the invention, when a difference occurs between video data and audio data, a video frame may be inserted at a predetermined position if the difference is equal to or larger than a predetermined amount or a video frame is thinned out from a predetermined position. Thus, the difference between the video data and the audio data can be reduced, which can prevent unnatural timings of video images and voice.

Having described the embodiment and the variation example of the embodiment of the invention, the invention is not limited to the embodiment of the invention and the variation of the embodiment. Various changes and applications can be made to the invention without departing from the scope and spirit of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A playback method to play video data and audio data associated with the video data, the method comprising:

calculating a time difference between a video playback interval and a corresponding audio playback interval, the video playback interval being based on a first unit of processing for the video data and designated by playback interval designated information, and the audio playback interval being based on a second unit of processing for the audio data which is a different length than that of the first unit of processing;

converting, as a frequency conversion, the video data from a first frame frequency to a second frame frequency by performing 3:2 pull-down processing such that a plurality of three-frame groups and a plurality of two-frame groups are alternately produced, resulting in the second frame frequency having a five-to-two relationship with the first frame frequency; and after the frequency conversion, converting, as a video playback interval length conversion, the length of the video playback interval, based on the calculated time difference between the video playback interval and the audio playback interval, wherein the video playback interval length is converted by inserting one frame into a specified two-frame group, of the plurality of two-frame groups, or by deleting one frame from a specified three-frame group, of the plurality of three-frame groups, and after the video playback interval length conversion, adjacent groups of frames formed during the frequency conversion have a frame quantity difference of less than or equal to one frame.

2. The playback method according to claim 1, wherein a reference signal delays playback of the video data by a time equivalent to one frame by inserting the one frame into the specified two-frame group, of the plurality of two-frame groups.

3. The playback method according to claim 1, wherein a reference signal advances playback of the video data by a time equivalent to one frame by deleting the one frame from the specified three-frame group, of the plurality of three-frame groups.

4. The playback method according to claim 1, wherein the video playback interval length is defined by a time interval during which playback of a predetermined number of video frames at a predetermined frame rate occurs.

5. A non-transitory computer readable medium having instructions stored therein that when executed by a processing circuit implements a playback method to play video data and audio data associated with the video data, the method comprising:
- calculating a time difference between a video playback interval and an audio playback interval, the video playback interval being based on a first unit of processing for the video data and designated by playback interval designated information, and the audio playback interval being based on a second unit of processing for the audio data which is a different length than that of the first unit of processing;
- converting, as a frequency conversion, the video data from a first frame frequency to a second frame frequency by performing 3:2 pull-down processing such that a plurality of three-frame groups and a plurality of two-frame groups are alternately produced, resulting in the second frame frequency having a five-to-two relationship with the first frame frequency; and
- after the frequency conversion, converting, as a video playback interval length conversion, the length of the video playback interval, based on the calculated time difference between the video playback interval and the audio playback interval, wherein
- the video playback interval length is converted by inserting one frame into a specified two-frame group, of the plurality of two-frame groups, or by deleting one frame from a specified three-frame group, of the plurality of three-frame groups, and
- after the video playback interval length conversion, adjacent groups of frames formed during the frequency conversion have a frame quantity difference of less than or equal to one frame.

6. The playback method according to claim 5, wherein the video playback interval length is defined by a time interval during which playback of a predetermined number of video frames at a predetermined frame rate occurs.

7. A playback apparatus to play video data and audio data associated with the video data, the apparatus comprising:
- a controller configured to calculate a time difference between a video playback interval and an audio playback interval, the video playback interval being based on a first unit of processing for the video data designated by playback interval designated information, and the audio playback interval being based on a second unit of processing for the audio data which is a different length than that of the first unit of processing;
- a first conversion unit configured to convert, as a frequency conversion, the video data from a first frame frequency to a second frame frequency by performing 3:2 pull-down processing such that a plurality of three-frame groups and a plurality of two-frame groups are alternately produced, resulting in the second frame frequency having a five-to-two relationship with the first frame frequency; and
- a second conversion unit configured to convert, after the frequency conversion by the first conversion unit and as a video playback interval length conversion, the length of the video playback interval based on the calculated time difference between the video playback interval and the audio playback interval, wherein
- the video playback interval length is converted by inserting one frame into a specified two-frame group, of the plurality of two-frame groups, or by deleting one frame from a specified three-frame group, of the plurality of three-frame groups, and
- after the video playback interval length conversion by the second conversion unit, adjacent groups of frames formed during the frequency conversion have a frame quantity difference of less than or equal to one frame.

8. The playback apparatus according to claim 7, wherein the controller is further configured to generate a reference signal that delays playback of the video data by a time equivalent to one frame by inserting the one frame into the specified two-frame group, of the plurality of two-frame groups.

9. The playback apparatus according to claim 7, wherein the controller is further configured to generate a reference signal that advances playback of the video data by a time equivalent to one frame by deleting the one frame from the specified three-frame group, of the plurality of three-frame groups.

10. The playback apparatus according to claim 7, wherein the video playback interval length is defined by a time interval during which playback of a predetermined number of video frames at a predetermined frame rate occurs.

* * * * *